May 8, 1956 A. WITTLIN 2,744,488
LIQUID FLOW INDICATOR
Filed Oct. 11, 1952
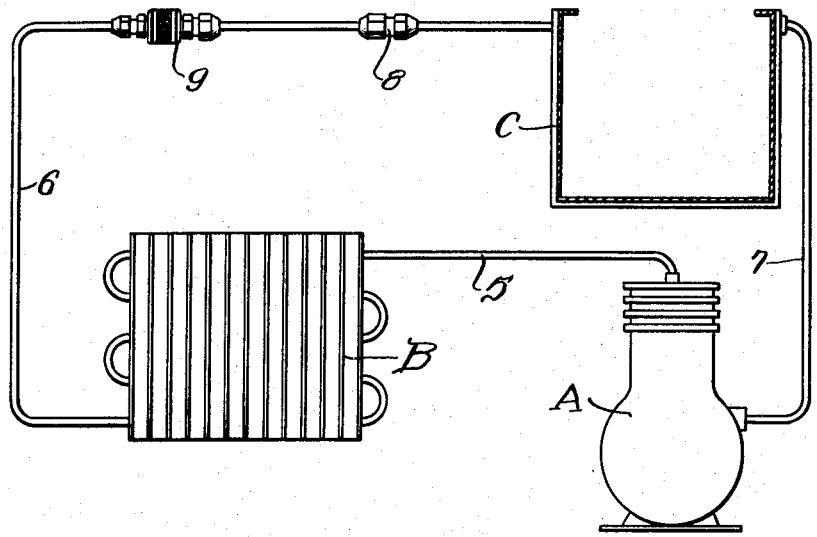
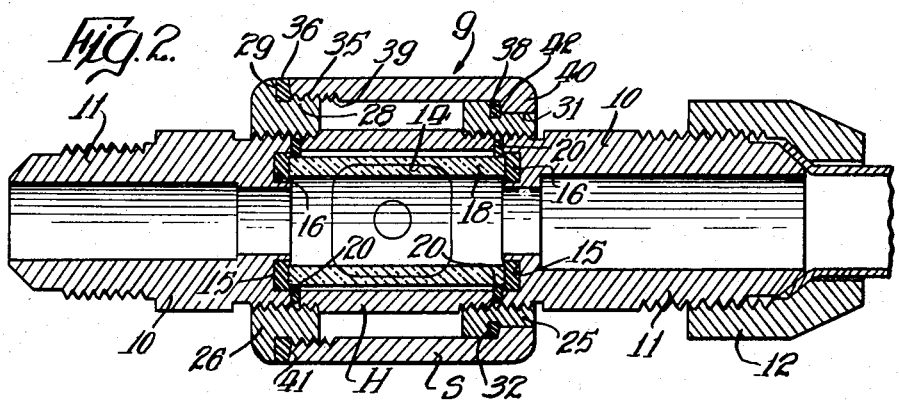
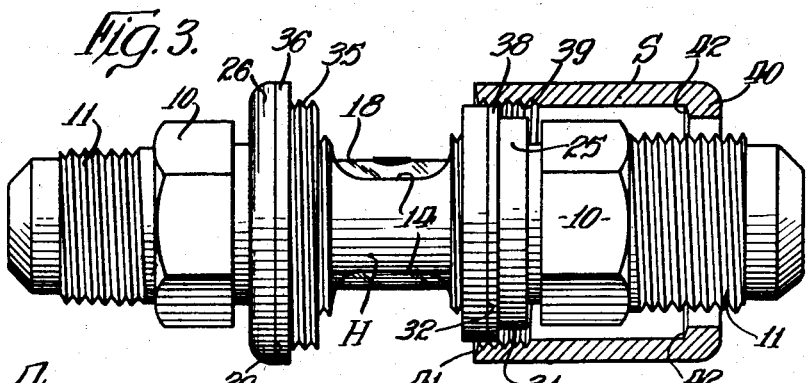
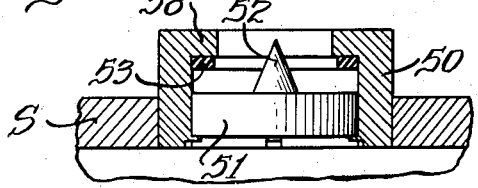
INVENTOR.
Albert Wittlin
BY
Schroeder, Merriam, Hofgren & Brady
Attys.

United States Patent Office 2,744,488
Patented May 8, 1956

2,744,488

LIQUID FLOW INDICATOR

Albert Wittlin, Chicago, Ill.

Application October 11, 1952, Serial No. 314,263

8 Claims. (Cl. 116—117)

This invention relates to an indicator adapted to be interposed in a circulatory system whereby to reveal not only the presence of a fluid passing therethrough but also, in many cases, its condition as well. More particularly the present features of improvement are concerned with a protecting sleeve which surrounds the indicator and is movable axially from one position to another whereby to afford a view of the indicator window and of the fluid exposed therethrough, or to fully cover the window and establish a sealing connection with the housing therefor. Such a protecting sleeve is effective to prevent any loss of fluid in the event that the window should be broken or that its mounting within the housing should not remain fluid-tight.

This application is a continuation-in-part of my copending application, Serial No. 194,144, filed November 4, 1950.

The present indicator has been designed with special reference to refrigerator systems wherein a refrigerant is required to be circulated through a line under pressures which may at times reach 250 lbs. Such an indicator is provided with an enlarged elongated housing wherein is mounted a transparent cylinder through which the fluid freely moves without deviating from a straight line. The cylinder mounting is such as to permit the cylinder to float in a wholly unstressed condition, while exposing a considerable portion of its surface to view so that the presence or condition of the fluid therewithin may be ascertained readily by inspection.

The protector sleeve for the transparent cylinder is normally advanced into sealing engagement with a pair of spaced gaskets at opposite ends of the window, the arrangement being such that if the window should leak or break, the fluid escaping therethrough will be confined by the sleeve between the two sealing gaskets. Such a sleeve, however, may be readily shifted axially the short distance that is required to fully expose the window whereby to permit an inspection of the fluid passing therewithin. The sealing gaskets with which the sleeve cooperates may optionally be carried by a pair of rings which are in screw threaded connection with the exterior of the housing, these rings serving additionally as couplings for end fittings which are comprised in the indicator housing.

Certain embodiments of this invention are set forth in the accompanying drawings wherein:

Figure 1 is a diagrammatic view of a refrigerating system incorporating the usual operating units and also the indicator of this invention;

Figure 2 is a longitudinal sectional view through the indicator showing the protecting sleeve in the normal position where it is in sealing engagement with the gaskets therefor;

Figure 3, which is a similar view, shows the sealing ring shifted axially to a second position where the housing window is exposed to view; and Figure 4 is a fragmentary sectional elevation through a sealing ring or shield illustrating a second embodiment of the invention.

In the showing of Figure 1, there is a compressor A from which a refrigerant is pumped under pressure through a line of tubing 5 to a condenser B. A tubing line 6 extends from the condenser through to an evaporator C and from thence another line of tubing 7 leads back to the compressor. A fluid flow regulator 8 is desirably included in the system. The indicator of the present invention, designated as 9, is also interposed in this system at any convenient point.

The present indicator comprises three principal parts, viz. an elongated tubular housing H and at each end thereof a head or coupling member 10 having an axially extended nipple 11 which is threaded exteriorly to receive a coupling 12 whereby to establish connection with the circulatory line of a refrigerating system or the like. Window openings 14 are provided on opposite sides of the housing, as shown.

In the construction shown, each nipple head is formed on its end proximate to the housing with an annular groove 15 wherein is fitted a resilient gasket 16 which engages one end of a transparent cylinder 18 of glass or the like serving as a sight tube that is visible through either window 14. There is also interposed a gasket 20 between each head 10 and the housing H to establish a fluid-tight connection therebetween.

The two heads may be joined to the housing by means of rings 25 and 26 each of which is in screw threaded connection with one end portion thereof; each ring also extends axially beyond the proximate housing end to receive engagement from the threaded end portion of the head. After each ring has been screwed in place on the housing or on its associated head, the part to be coupled thereto is also fitted into the ring and advanced rotatively therewithin. The threaded portions of the housing are desirably extended to a predetermined point endwise thereof so that each ring 25 and 26, when advanced to its limit thereon, will be spaced a predetermined distance from the other. This is important for a reason which will presently appear.

In the embodiment of the invention illustrated in the accompanying drawings, the locking means for interlocking the coupling members 10 and sight tube 18 in fluid-tight relationship includes the gaskets 16 at the ends of the sight tube, the housing H which extends between and has its outer surface aligned with the coupling members 10, and the two end rings 25 and 26 which join the coupling members or head 10 to the ends of the housing H, as illustrated most clearly in Figure 2. The effect of this combination, therefore, is that the coupling members 10 may be advanced toward each other by turning one or both coupling members relative to one or both rings 25 and 26. This serves to compress the gaskets 15 against the ends of the sight tube 18 and against the adjacent ends of the coupling members 10 to make a fluid-tight seal between the coupling members 10 and sight tube 18 in the manner illustrated. Furthermore, if there should be some yielding of the gaskets 16, this may be easily taken up by merely turning one or both of the coupling members 10 in the manner just described.

The outside diameter of the ring 26 is somewhat larger than is that of the ring 25. It is also contoured with a circular base 28 from which upstands a shoulder 29 which faces laterally toward the smaller ring 25 whereon is also formed a circular base 31 of lesser diameter having a shoulder 32 at one end thereof. The shoulders of the two rings face in the same direction and are of unequal diameters, corresponding generally to the differential in the diameters of their respective bases. The circular base 28 of the larger ring 26 is formed with projecting threads 35 which terminate short of the shoulder 29 to provide a seat for a sealing gasket 36. A seat is also provided adjacent the shoulder 32 for reception of a second sealing gasket 38.

The protecting ring or fluid impervious shield S which is a feature of this invention is formed with an outside diameter substantially the same as that of the larger shoulder 29 and with an internal diameter substantially the same as that of its circular base 28. Screw threads 39 are formed internally of the sleeve at one end, and when assembled in place the sleeve is adapted to engage the larger ring 26 and establish a screw threaded connection therewith. The opposite end of the sleeve S is formed with a flange 40 which extends inwardly a distance about equal to the height of the smaller shoulder 32 so as to substantially engage its circular base 31. The larger end of the sleeve is shown as beveled slightly, at 41, and a similar bevel 42 is provided inwardly of the flange 40, these two beveled faces being arranged to engage the gaskets 36 and 38, respectively, and compress them slightly inwardly.

When the sleeve is assembled in place, it is moved past the small ring 25 so as to engage with the threads 35 on the circular base 28 of the larger ring. By rotating the sleeve to its limit, the gasket 36 is engaged concurrently with engagement of the gasket 38, and both are placed under substantially equal pressures when the axial movement of the sleeve is arrested. The sleeve, when so positioned, provides an annular wall spaced outwardly from the housing H and in sealing engagement with the two rings 25 and 26 so that any fluid escaping through the housing window will be confined to the space inwardly of the sleeve.

When an inspection is to be made, the sleeve is rotated to move axially away from the circular base 28 and when disengaged therefrom is free to be shifted endwise to fully expose the transparent window. The sleeve may then be left in this disconnected position, or be replaced in sealing position over the housing window. Thus there will always be ample protection, either maintained or available, to prevent any loss of fluid from the housing should there be any loss of fluid through or around the glass viewing cylinder.

An alternate embodiment of the invention is illustrated in Figure 4. In this embodiment the sealing ring or shield S has an opening in one portion of its wall provided with a pressure responsive signal device operable by pressure within the shield to notify an observer of a leak in the fluid flow indicator. This pressure responsive signal device, as illustrated in the drawings, includes an outwardly projecting tubular member 50 positioned in an opening in the shield and provided on its outer end with an inwardly projecting annular flange 58. As can be seen in Figure 4, the tubular member 50 extends beyond the outer surface of the shield. Positioned within the tubular member 50 is a movable pressure responsive signal member 51 that is movable outwardly under the influence of internal pressure within the shield S. This signal member 51, therefore, acts as a piston movably mounted within the member 50. The signal member 51 is preferably provided with an attention attracting indicia member such as the raised projection 52 so that when the signal member 51 has been moved outwardly by internal pressure, the raised projection 52 will be moved into position to be viewed by an observer. When this occurs, the signal member 51 seats against an annular gasket 53 on the inner surface of the flange 58 and makes sealing engagement therewith to prevent escape of fluid around the sides of the member 51. The internal pressure within the shield will hold the signal member 51 against this gasket. Thus there will be no leakage of fluid and a maintenance man can interrupt the fluid flow to replace or repair the portion of the indicator that has failed. This alternate embodiment illustrated in Figure 4 immediately indicates when there is a leak in the indicator and when the fluid flow must be interrupted before the shield S is removed.

As is evident from the above description, any type of pressure responsive signal device may be used as desired. This device has the important feature of notifying an observer, such as a maintenance man, that either the transparent tube 18 has been accidentally broken, that there has been a failure in a gasket or that some similar accident has occurred to permit the fluid to escape from the indicator and bear against the signal device. When such a signal device is not provided, there is always danger that an internal break has occurred and the operator is not aware of this until he begins to remove the shield. This, of course, cannot occur in the embodiment illustrated in Figure 4 of the drawings.

Having described my invention as related to the embodiments shown in the drawings, it is my intention that the invention be not limited by any of the details of description, unless otherwise specified, but rather be construed broadly within its spirit and scope as set out in the accompanying claims.

I claim:

1. A fluid flow indicator, comprising: a pair of spaced coupling members attachable in fluid flow relationship to a fluid line; a transparent sight tube extending between the coupling members through which the fluid is adapted to flow; locking means for interlocking the coupling members and sight tube in fluid tight relationship; a readily removable fluid impervious shield normally surrounding the sight tube but removable to expose the sight tube; and means sealing the shield to the assembly in fluid tight relationship when the shield is in position surrounding the sight tube.

2. A fluid flow indicator, comprising: a pair of spaced coupling members attachable in fluid flow relationship to a fluid line; a transparent sight tube extending between the coupling members through which the fluid is adapted to flow; locking means for interlocking the coupling members and sight tube in fluid tight relationship, the locking means being provided with annular sealing portions adjacent to the opposite ends of the sight tube; and a readily removable tubular fluid impervious shield normally arranged in fluid tight relationship against said portions and surrounding the tube but movable longitudinally of the indicator and away from said portions to expose the sight tube.

3. The indicator of claim 2 wherein said portions comprise annular shoulders with the first shoulder having an outside diameter not greater than the inside diameter of the end of the shield engageable with the second shoulder to permit slipping the shield over the first shoulder and into sealing engagement with both shoulders.

4. The indicator of claim 3 wherein each shoulder is provided with a sealing gasket, the end portions of the shield bearing against the gaskets when the shield is in its normal position around the sight tube.

5. A fluid flow indicator, comprising: a pair of spaced coupling members attachable in fluid flow relationship to a fluid line; a transparent sight tube extending between the coupling members through which the fluid is adapted to flow; locking means for interlocking the coupling members and sight tube in fluid tight relationship; a readily removable fluid impervious shield normally surrounding the sight tube but removable to expose the sight tube; means sealing the shield to the assembly in fluid tight relationship when the shield is in position surrounding the sight tube; and a pressure responsive signal member operable by pressure within the shield thereby to notify an observer of a leak in the indicator.

6. The flow indicator of claim 5 wherein the signal member is mounted on the shield and communicates with the interior thereof.

7. A fluid flow indicator, comprising: a pair of spaced coupling members attachable in fluid flow relationship to a fluid line; a transparent sight tube extending between the coupling members through which the fluid is adapted to flow; locking means for interlocking the coupling members and sight tube in fluid tight relationship; a readily removable fluid impervious shield normally surrounding the sight tube but removable to expose the sight tube; means sealing the shield to the assembly in fluid tight relationship when the shield is in position surrounding the sight tube; an outwardly projecting tubular member communicating with the interior of the shield; and a movable pressure responsive signal member in the tubular member movable outwardly under internal pressure thereby to notify an observer of a leak in the indicator.

8. The flow indicator of claim 7 wherein the signal member carries an attention attracting indicia visible externally when the signal member is moved into signalling position.

References Cited in the file of this patent

UNITED STATES PATENTS

| | | |
|---|---|---|
| 738,503 | Waters | Sept. 8, 1903 |
| 2,002,883 | Deming | May 28, 1935 |
| 2,445,176 | Hoffman | July 13, 1948 |
| 2,600,148 | Wittlin | June 10, 1952 |
| 2,664,846 | Gray | Jan. 5, 1954 |